(12) United States Patent
Wang et al.

(10) Patent No.: US 6,523,233 B1
(45) Date of Patent: Feb. 25, 2003

(54) METHOD AND APPARATUS FOR TELEPHONE NETWORK IMPAIRMENT DETECTION AND COMPENSATION IN SIGNAL TRANSMISSION BETWEEN MODEMS

(75) Inventors: Zhenyu Wang, Morganville, NJ (US); JinGuo Yu, Manalapan, NJ (US)

(73) Assignee: Agere Systems, Inc., Berkeley Heights, NJ (US)

( * ) Notice: Subject to any disclaimer, the term of this patent is extended or adjusted under 35 U.S.C. 154(b) by 0 days.

(21) Appl. No.: 09/296,516

(22) Filed: Apr. 22, 1999

(51) Int. Cl.[7] .............................. H04B 1/38; H04B 17/00
(52) U.S. Cl. ........................ 26/224; 375/222; 379/92.04
(58) Field of Search ............................... 375/224, 219, 375/220, 222; 379/130, 92.04, 93.01, 93.09, 27; 370/225

(56) References Cited

U.S. PATENT DOCUMENTS

| | | | |
|---|---|---|---|
| 4,189,715 A | 2/1980 | Duttweiler | 340/347 |
| 4,467,318 A | 8/1984 | Zeitraeg | 340/347 |
| 4,805,192 A | 2/1989 | Confalonieri et al. | 375/25 |
| 5,212,481 A | 5/1993 | Ichihara | 341/75 |
| 5,481,567 A | 1/1996 | Betts et al. | 375/261 |
| 5,724,393 A | 3/1998 | Dagdeviren | 375/296 |
| 5,917,853 A * | 6/1999 | Greenblatt | 375/222 |
| 6,023,493 A * | 2/2000 | Olafsson | 370/507 |
| 6,088,334 A * | 7/2000 | Davenport et al. | 370/248 |
| 6,173,161 B1 * | 1/2001 | Gross, JR. | 455/310 |
| 6,185,249 B1 * | 2/2001 | Drucker et al. | 370/523 |
| 6,301,296 B1 * | 10/2001 | Krishnan et al. | 375/222 |
| 6,327,301 B1 * | 12/2001 | Demjanenko et al. | 375/222 |

* cited by examiner

Primary Examiner—Chi Pham
Assistant Examiner—Khai Tran
(74) Attorney, Agent, or Firm—Synnestvedt & Lechner LLP

(57) ABSTRACT

A general, low cost method for detecting and compensating any non-linear digital impairment and linear analog gain for data communication systems transmitting signals through telephone networks is disclosed. The inventive method eliminates the need of costly digital impairment tables any $\mu$-law encoders/decoders. Before each data transmission session, non-linear digital impairment and linear analog impairment is computed and then compensations for the digital and analog impairments are performed. Thereon, the actual data transmission begin. The digital impairment and analog impairment values must be computed for each data transmission session, but the values remain constant for the entirety of a session.

26 Claims, 4 Drawing Sheets

METHOD AND APPARATUS FOR TELEPHONE NETWORK IMPAIRMENT DETECTION AND COMPENSATION IN SIGNAL TRANSMISSION BETWEEN MODEMS

FIELD OF THE INVENTION

This invention relates to signal processing, and more particularly it relates to the resolution of errors caused by analog and digital impairment of telephone networks during the signal transmission between high speed modems.

BACKGROUND OF THE INVENTION

Telephone networks are generally used for voice as well as data communications with reference to data communications, a plurality of high speed modems (one of which is typically remotely disposed at the premises of a customer) are coupled together via a telephone network. Each modem is typically connected to the telephone network by a local exchange carrier (LEC) subscriber loop.

Generally, telephone networks include both analog and digital components. The digital components may include a T1 digital link, an integrated service digital network (ISDN), a fiber optic cable network, a coaxial cable network, a satellite network, and/or a wireless digital communications network. Further, the LEC subscriber loop may comprise either an analog or a digital communications path.

During a data communication session between remotely disposed modems, one modem (the transmitting modem) initiates a data transmission and another modem (the receiving modem) receives the transmission. Usually an A/D converter is required for converting analog signals from an analog portion of the network into digital signals for subsequent transmission over the digital portion of the network. Similarly, a D/A converter is required for converting digital signals carried on the digital portion of the network into analog signals for subsequent transmission over the analog portions of the network.

In North America and Japan, data communications over the telephone networks are conducted in accordance with pulse code modulation (PCM) "$\mu$-law" encoding and decoding techniques. In Europe, communications are conducted in accordance with "A-law" encoding and decoding technique. In accordance with those well-known PCM $\mu$-law or A-law techniques, signals are transmitted in the form of PCM signals. PCM signals consist, in general, of a series of binary code words in which each word represents an instantaneous value of a periodically sampled and quantized analog signal. In normal usage, these code words are transmitted in the form of a serial bit stream to a receiving subscriber loop where they are decoded into a reconstructed version of the original analog signal.

When a PCM code goes through a telephone network, the PCM code values can be changed due to digital switching in the telephone networks. These changes introduce an error element known as "impairment" which can have both digital and analog components. The combined analog and digital components are known collectively as "network impairment." The network impairment causes PCM modems to mis-code signals and interferes with the performance of the data communication.

Attempts have been made to compensate for network impairment. These techniques include the use of encoders/decoders which hold digital impairment tables depicting preselected analog levels corresponding to the digital code words in accordance with the $\mu$-law or A-law standards.

FIG. 4 illustrates a prior-art telephone network configuration 10 implementing one of these prior-art techniques. In FIG. 4, two remotely disposed (client site) modems 101 and 115 are coupled via a typical telephone network. In the outgoing (transmitting) direction, modem 101 transmits a signal to a first hybrid 103. The hybrid 103 separates a bidirectional analog signal received from the modem 101 into a unidirectional transmit signal. This unidirectional transmit signal is then converted to a digital signal at A/D converter 105. The digital signal is then encoded into a PCM signal at encoder 107, which routes the encoded signal to a digital network 113. After traversing the digital network 113, the encoded signal is decoded at decoder 109 and is then converted back (regenerated) to an analog signal at D/A converter 111. The analog signal is then output to a second hybrid 103A which separates the bidirectional signal received from the D/A converter 111 into a unidirectional signal and delivers the unidirectional signal to the second modem 115.

In the reverse incoming (receiving) direction, the signal follows an essentially identical path in the reverse direction via the second hybrid 103A, A/D converter 105A, encoder 107A, digital network 113, decoder 109A, D/A converter 111A, and the first hybrid 103.

In the configuration of FIG. 4, a typical signal is encoded/decoded many times while being transmitted through the telephone network 10. The constant encoding/decoding and conversion between digital and analog signals produces an inherent quantization error in the transmitted signal. This error arises from the fact that the amplitude of the regenerated analog signal does not exactly match the analog signal level of the original signal.

FIG. 5 illustrates an alternative telephone network configuration 20 in which the A/D or D/A conversion and the need for encoding/decoding between digital and analog signals is reduced. This is a typical configuration of a communications network wherein a central site modem 201 (a network modem) downloads information to a client modem 210 (for example, an internet application where a network modem downloads large blocks of information to client site modem 210). In the configuration of FIG. 5, central site mode 201 is coupled directly to the digital network 213. The quantization error is reduced because there is no conversion or encoding/decoding between the modem 201 and the digital network 213. The connection between the digital network 213 and the client site modem 210 is essentially identical to the same connection in FIG. 4.

U.S. Pat. No. 5,724,393 (the '393 patent), assigned to the assignee hereof, discloses a method of reducing the quantization error resulting from the encoding/decoding in transmissions between modems. As explained in the '393 patent, the quantization error can be reduced by scaling down the amplitude levels of signals generated by the transmitting modem by a predetermined reduction factor and then performing an inversion mapping in which the amplitude level of the factored, $\mu$-law encoded signals is scaled up by a predetermined inversion factor.

Typical prior art systems for reducing telephone network impairment rely on the use of predefined impairment tables associated with the most commonly used telephone switches. The need to use large predefined telephone network impairment tables reduces the flexibility of these prior art systems and increases the cost. In addition, this solution can be difficult to deploy in a long distance telephone network which combines different types of switches (e.g., mixed A-law and µ-law standards) because the encoders and decoders used in the system will vary system-wide depending on which standard is in use.

Thus, there exists a need for a general, low cost method for detecting and compensating telephone network impairment which may result in a constant signal performance over a wide dynamic range (with minimum quantization error) and which may be applicable to a variety of telephone networks including mixed µ-law and A-law networks.

SUMMARY OF THE INVENTION

A method and apparatus for automatically detecting and compensating for telephone network impairment in a telephone network is disclosed. The inventive method eliminates the need for predefined digital impairment tables and can be applied to any telephone network including those which utilize different types of switches and µ-law/A-law mixed switches. The inventive method also eliminates the quantization error typically present in the transmission of signals due to the use of encoders/decoders. It is a low cost solution and does not require any pre-knowledge about the telephone network and may be used in telephone network deploying switches which are currently under development or often upgraded.

According to the present invention, a first modem (acting as a transmitting modem), coupled to a second modem (acting as a receiving modem) by a telephone network, computes analog and digital impairment before establishing an actual data transmission session. The transmitting modem (typically a digital modem) sends a digital test signal to the receiving modem. The received test signal is analyzed and total network impairment (analog and digital combined) in the telephone network is determined by comparing the transmitted test signal to the received test signal and identifying any differences (for example miscoding). The received signal has an analog component and a digital component.

Next, the analog impairment is computed separately. To compute the analog impairment, first a corresponding analog level of the transmitted digital test signal is computed or estimated in accordance with µ-law encoding/decoding techniques or A-law encoding/decoding techniques. After a corresponding analog level is known, analog impairment is computed by comparing the corresponding analog level to the analog component of the received test signal. The difference between the analog level and the received test signal is the analog impairment (also known as distortion). The digital impairment is then calculated by comparing the total telephone network impairment and analog impairment and finding a difference between them.

After analog impairment and digital impairments have been computed, the appropriate compensation for analog impairment and digital impairment is performed by using prior art compensation schemes. There are separate compensation schemes for analog and digital impairments and these compensation schemes negate the effects of telephone network impairment.

The actual data transmission from transmitting modem to receiving modem occurs with the selected compensation scheme being applied so that the received signal is not impaired. This ensures a constant signal transmission between the transmitting modem and receiving modem.

DETAILED DESCRIPTION OF THE PREFERRED EMBODIMENT

Figure 1:
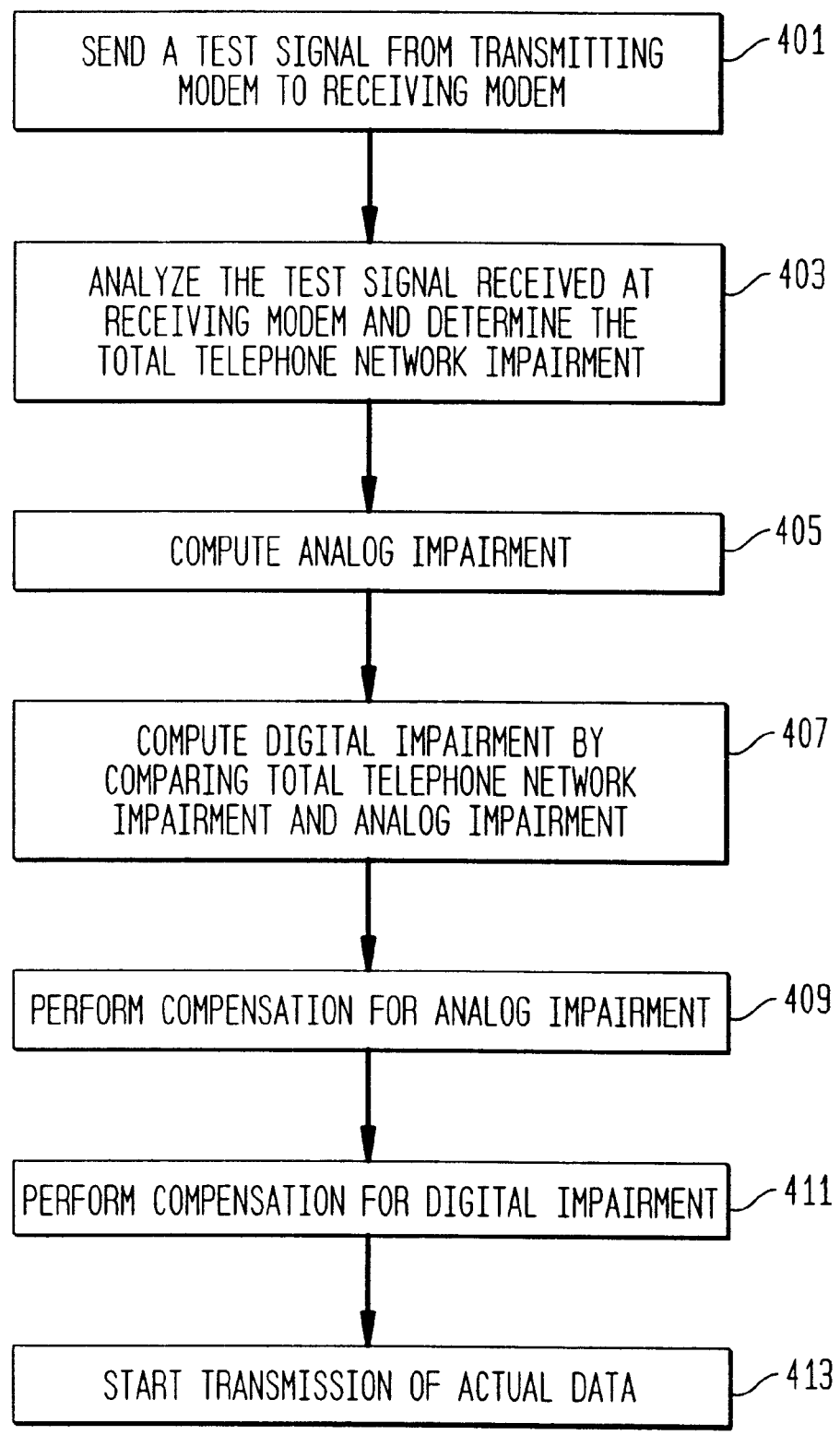
FIG. 1 is a flow chart depicting the various steps involved in the implementation of the present invention.

FIG. 1 is a flow-chart depicting generally the steps involved in the implementation of the present invention. Before a data transmission occurs from a transmitting modem to a receiving modem coupled via a telephone network, a known digital test signal is sent over the transmission path between the two modems established by a typical telephone network (step 401). Next, in step 403, the test signal received at the receiving modem (having both an analog and digital component) is analyzed and the total network impairment (combined analog and digital impairment) is determined by comparing the known coding of the transmitted test signal and the coding of the received test signal.

In step 405, the analog impairment is computed separately. It is known that for any telephone network, there exists a known analog level corresponding to the original test signal (in accordance with µ-law standards or A-law standards). Thus, by comparing the known analog level corresponding to the original test signal and the analog component of the received test signal, analog impairment is computed.

After the analog impairment has been computed, the digital impairment is computed in step 407 by comparing the total network impairment determined at step 403 to the analog impairment determined at step 405 and calculating the difference between them. Once the analog impairment and digital impairment are known, suitable compensation schemes can be determined and selected from well-known compensation schemes. The actual data transmission from transmitting modem to receiving modem occurs in step 413, with the selected compensation scheme being applied so that the received signal is not impaired.

Figure 2:
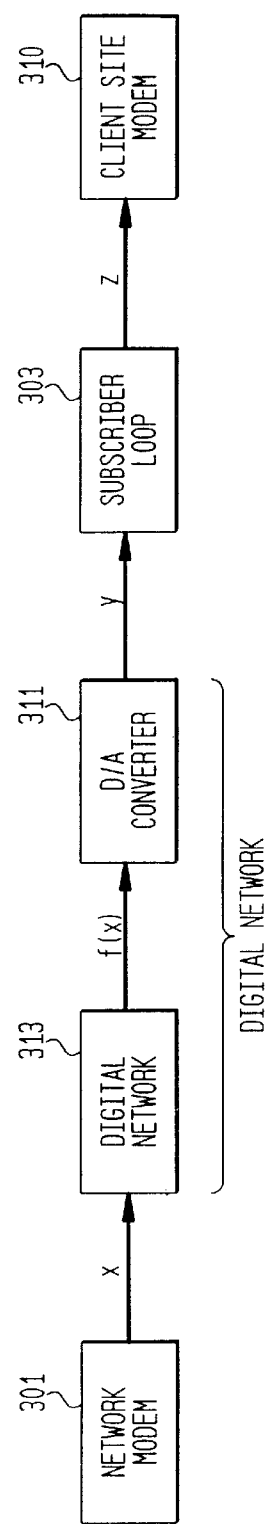
FIG. 2 is a block diagram of a preferred embodiment of the present invention wherein a network modem and a client side modem are coupled via a telephone network.

FIG. 2 illustrates an exemplary network configuration in accordance with the principles of the present invention. As shown in FIG. 2, a network modem 301 is directly connected to digital network 313 and a D/A converter 311 is placed between the digital network 313 and an analog subscriber loop 303. A client site modem 310 is coupled at the opposite end of the subscriber loop 303. Typically, network modem 301 and client site modem 310 are PCM modems.

In FIG. 2, the network modem 301 (preferably a PCM modem located at a central site) is transmitting the data to the client side modem 310. In accordance with the method described above with reference to FIG. 1, prior to actual transmission of data, a total telephone network impairment in reaching the client site modem 310 is computed. To compute total telephone network impairment, modem 301 sends a test signal to the client site modem 310. The test signal, comprising a PCM code (termed "x"), passes through the digital network 313 (the switches and other transmission mediums of digital network 313) which outputs another signal f(x). The f(x) contains the changes caused by digital impairment present in the telephone network. Next, the signal f(x) is output to a D/A converter 311, which converts a digital signal f(x) to an analog signal "y", wherein "y" is analog level equivalent of digital signal f(x).

The PCM code value at the output of D/A converter 311 is no longer "x", it has been changed to a new value termed "y" due to conversion functions. The transfer function between "x" and "y" is noted as f(x) and y=f(x), wherein f(x) represents the digital impairment function which is non-linear in nature and depends on the properties of switches located in digital network 313 and on the properties of D/A converter 311.

The signal "y" is then input to an analog subscriber loop 303. Here "y" is once again changed by an analog attenuation function g(y) to a new value "z". The g(y) is an analog attenuation which is a linear function for a particular PCM signal, so $$g(y)=z, \text{ or } z=G*y$$

wherein g(y) is a linear analog attenuation function and G represents the analog impairment (analog loss) of an analog line which applies to all PCM levels.

The signal "z" is then forwarded to the client site modem 310. Thus, the signal received after total network impairment is:

$$z=G*f(x)$$

Thus, even though a signal "x" was sent from the network modem 301, signal "z" was received at the client site modem due to the telephone network impairment (the telephone network impairment comprising analog impairment G and digital impairment f(x)).

To ensure the integrity of signal transmission, this telephone network impairment must be computed and compensated for. It is necessary to make separate compensations for analog and digital impairments as there are no known schemes for compensating the total telephone network impairment.

Thus, analog impairment G and digital impairment f(x) must be computed separately. First, analog impairment G is computed. There are many methods to compute analog impairment G, but, every method relies on the use of a basic principle stating that in any telephone network, a corresponding analog level to a digital signal must be set accordingly by either the $\mu$-law or A-law standard.

Thus, digital signal "x" converts to a corresponding analog level "y" (by digital network 313 and D/A converter 311 located in the telephone network) in accordance with some pre-defined $\mu$-law or A-law standard. Also, there exists a unique common impairment G, which causes the difference between the signal "y" (output by D/A converter 311) and the signal "z" (received at the client site modem 310) such that:

$$z=G*y=G*f(x);$$

wherein $x,y \in S_{ua}$, and $S_{ua}$ is a set of all valid codex output value for $\mu$-law (or A-law) standard;

G is a constant (linear) value representing an analog impairment for a particular data communication session; and f(x) is the digital mapping (digital impairment) from x to y.

OR $y=G_a*z$, wherein $G_a=1/G$ is the attenuation value,

OR $f(x)=G_a*z$, wherein $x, y \in S_{ua}$.

Then, $G_a$ is computed by solving the above equation. It is easy to find a solution to the above equation because, in the above equation, x is known, z is known, and y and x belong to a known set $S_{ua}$. Then, a suitable value for $G_a$ is determined which meets the requisites of the above equation. After $G_a$ has been computed, analog impairment G is computed by calculating the inverse of $G_a$. Digital impairment f(x) is then computed by substituting the value of $G_a$ and z in the above equation.

In the preferred embodiment, to compute $G_a$, only one set of data transmission is chosen (e.g. one test signal is transmitted), but in an alternative embodiment, a plurality of data transmission sets may be chosen.

In an alternative embodiment, the transmitting modem 301 sends a plurality of test signals $x_i$ wherein $x_i \in S_{ua}$. A set of corresponding data signals $z_i$ (received at the receiving modem 310) is then computed where $i=\{1,2,\ldots,N\}$ and N is total number of levels to be sent.

Then, $G_a$ is solved by calculating the following equation:

$$Y_i - G_a*z_i \in S_{ua} \text{ for any } i=\{1,2,\ldots N\}$$

wherein $x_i, Y_i \in S_{ua}$ Then $G_a$ is searched at various data levels $$x_0 \rightarrow y_0 = G_a * z_0$$
$$x_1 \rightarrow y_1 = G_a * z_1$$
$$x_2 \rightarrow y_2 = G_a * z_2$$
$$\vdots$$
$$x_i \rightarrow y_i = G_a * z_i$$
$$x_n \rightarrow y_n = G_a * z_n$$

After $G_a$ has been calculated, f(x) is computed by $$f(x)=G_a*Z_n;$$

wherein $g(y)=G=1/G_a$ is the analog impairment value; and y=f(x).

After G and f(x) have been calculated, the compensation of analog and digital impairment is implemented by applying the well-known compensation schemes. The compensations are made such that the test signal received at receiving modem is not "z" but is instead the equivalent of "x" which was the transmitting signal. Thus, the essence of the invention relies on the computation of the telephone network impairment. Once telephone network impairment has been computed, it remains constant for one data transmission session between network modem 301 and client side modem 310, but it varies for the next data transmission session. The next data transmission session may be between network modem 301 and same client site modem 310 or between network modern 301 and different client site modem.

Figure 3:
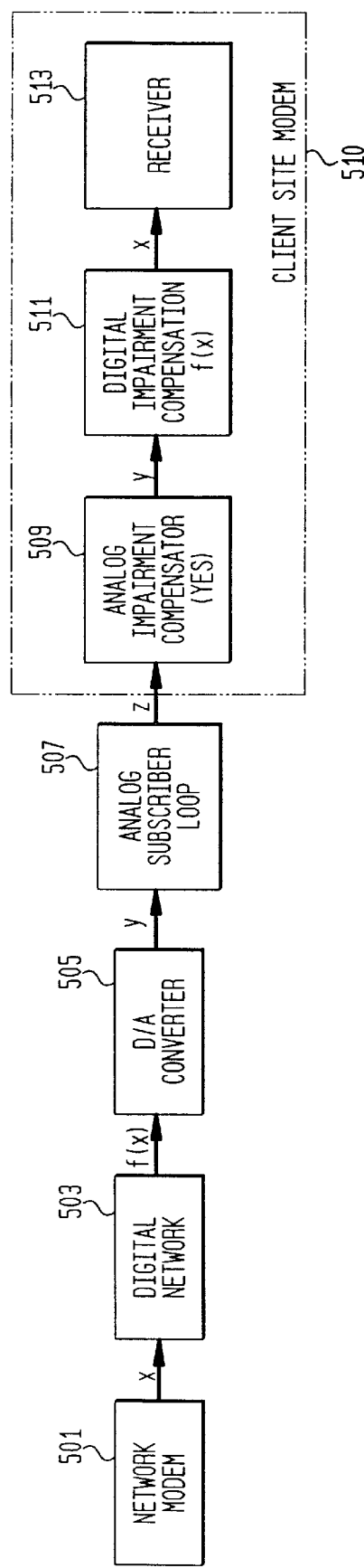
FIG. 3 is a block diagram illustrating the steps involved in the implementation of the present invention by the form of an example.
Figure 4:
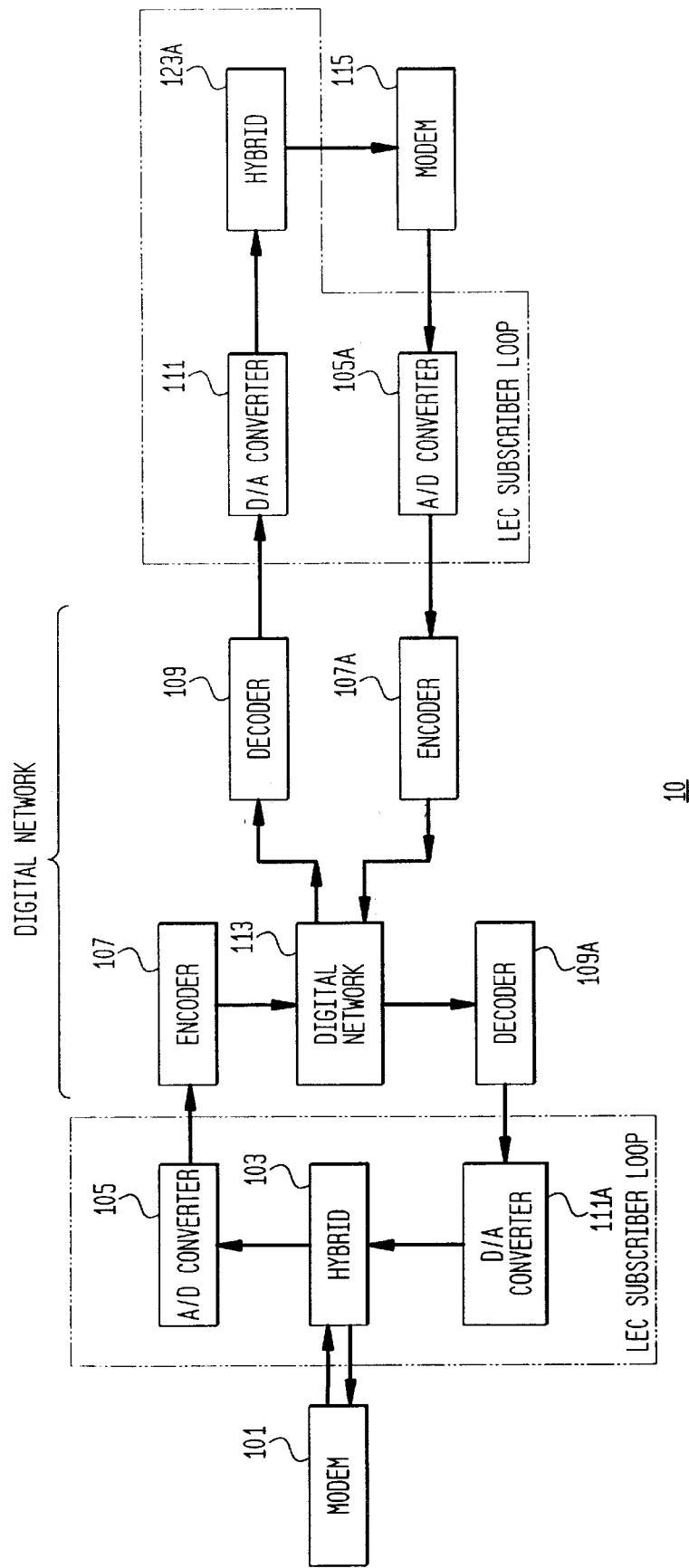
FIG. 4 is a block diagram of a prior art impairment compensation scheme.

FIG. 3 is a block diagram illustrating the steps involved in implementation of the present invention in the form of an example. In FIG. 3, a central site modem 501 is connected to a digital network 503. The digital network 503 is connected to a D/A converter 505. The D/A converter 505 is connected to analog subscriber loop 507, and analog subscriber loop 507 is connected to client site modem 510.

The central site modem 501 outputs a digital signal "x". The signal is then sent to the digital network 503, which outputs another signal f(x). The f(x) contains the changes caused by digital impairment present in the telephone network. Next, the signal f(x) is output to a D/A converter 505, which converts a digital signal f(x) to an analog signal "y", wherein "y" is analog level equivalent of digital signal f(x). The signal "y" is then input to an analog subscriber loop 507 and the output from the analog subscriber loop is "z" which is forwarded to the client site modem 510.

Thus a signal "x" was transmitted from a digital modem 501 but a signal "z" arrived at client site modem 510. In the present invention, a scheme is proposed to resolve this problem such that the input to the client site modem 510 is not "z" but is an equivalent of "x".

According to the principles of the present invention, prior to actual data transmission between the central site modem 510 and client site modem 510, an analog impairment compensation 509 and a digital impairment compensation 511 is performed. Typically, analog impairment compensation is accomplished by scaling down the amplitude level of signal "z" by the inverse of a predetermined factor. Hence, the amplitude level of the resulting signal will correspond to the analog amplitude level of the original signal "x". Thus, the input to the analog impairment compensation 509 is "z" and the output of the analog impairment compensation 509 is "y".

Figure 5:
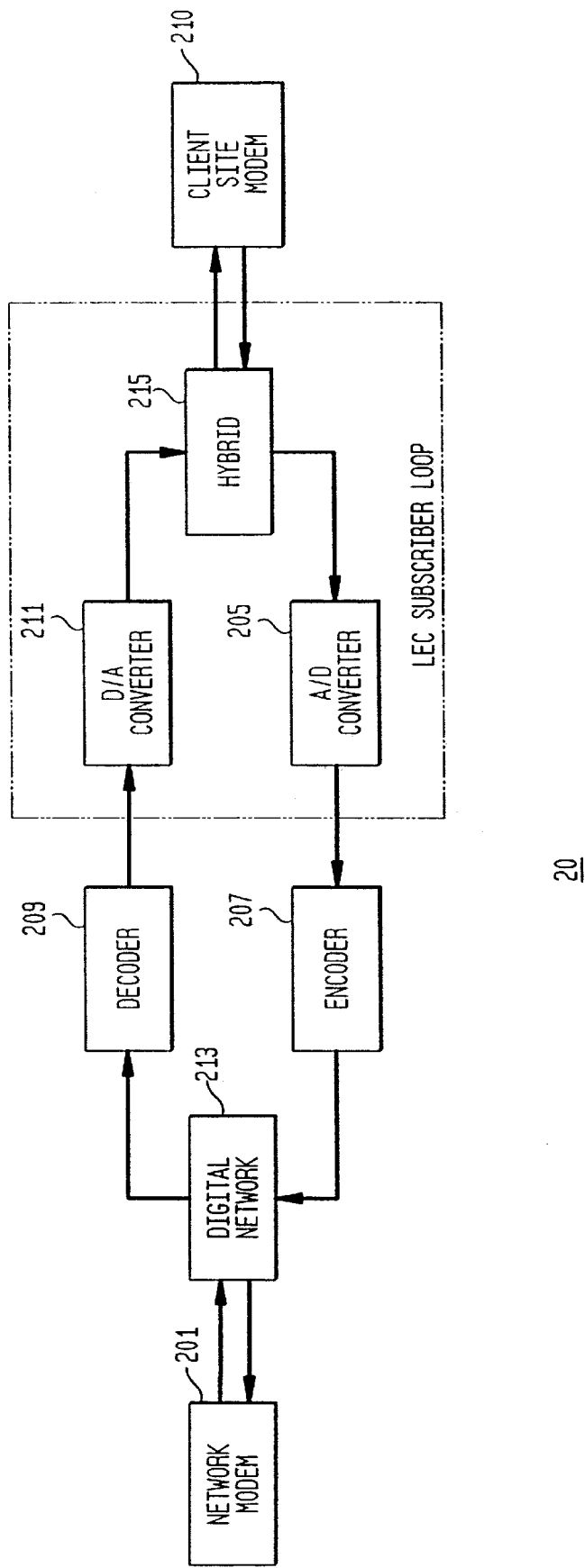
FIG. 5 is a block diagram of another prior art impairment compensation scheme.

In digital impairment compensation 511, an inversion mapping function is performed which translates as an inverse f(x). Thus the input to the analog impairment compensation is "y" and the output is "x'" which is an equivalent of "x". Thus in FIG. 5, first analog and digital impairments are computed and then compensations for analog and digital impairments are made such that the received signal at the client side modem 510 is not "z", but an equivalent of "x".

The blocks in FIG. 3 are shown only for illustrative purposes with reference to operation of the embodiments in the present invention. In FIG. 3, the analog impairment compensation 509 and the digital impairment compensation 511 is accomplished in the client site modem 510, but, in practice, the present invention may be implemented in a variety of ways. For example, in an alternative embodiment, analog impairment compensation may be accomplished within the transmitting modem 501. In this embodiment, the original signal generated by the transmitting modem 501 may be initially scaled down by the predetermined reduction factor in the transmitting modem 501 before it is output to the digital network 503. After having its amplitude reduced, the reduced signal may be converted into an analog signal and subsequently inversion mapped. The steps of scaling down and inversely mapping may also be performed independently or in combination within a digital network 503 itself.

In the preferred embodiment, the present invention is implemented in a network modem (digital modem) directly connected to a digital network and a client site modem that is indirectly connected to the digital network via a subscriber loop (analog loop). The present invention may be practiced in a variety of telephone network configurations wherein signal transmission is initiated by a digital source to an analog loop via a telephone network. This telephone network many employ analog components, digital components, or a mixture of analog and digital components.

The present invention eliminates the need to use costly digital impairment tables and $\mu$-law (or A-law) encoders/decoders and provides a general low cost method to detect and compensate any non-linear digital impairment and any linear analog impairment for a data communication system transmitting a signal through a telephone network.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. The foregoing description is by way of example only, and not limiting. The invention is limited only as defined in the following claims and equivalents thereto.

We claim:

1. A method for detecting and compensating for telephone network impairment in signal transmissions between a transmitting modem and a receiving modem coupled together via a telephone network, said telephone network comprising analog components and digital components, the method comprising the steps of:

(i) transmitting a test signal originating from said transmitting modem to said receiving modem via said telephone network;

(ii) determining a total telephone network impairment value for said transmitted test signal, said telephone network impairment value indicative of said telephone network impairment, including digital impairment and analog impairment, present in said telephone network;

(iii) analyzing said total telephone network impairment value; and (iv) compensating for said telephone network impairment.

2. The method of claim 1, said step (iii) further comprising the steps of:

computing an analog impairment between said transmitted test signal and said received test signal; and computing a digital impairment by subtracting said analog impairment from said total telephone network impairment value.

3. The method of claim 2, wherein said digital impairment is non-linear and said analog impairment is linear, and said method further comprising the successive steps of:

compensating for said analog impairment by scaling down an amplitude level of said transmitted test signal by a predetermined inversion factor; and compensating for said digital impairment by direct inversion mapping of said transmitted test signal.

4. The method of claim 3, wherein said compensating for steps are performed by said transmitting modem.

5. The method of claim 3, wherein said compensating for steps are performed by said receiving modem.

6. The method of claim 3, wherein said predetermined inversion factor is inversely proportional to said analog impairment.

7. The method of claim 2, wherein said step of computing analog impairment comprises the steps of:

determining a corresponding analog level of said transmitted test signal, said analog level being a member of a known standard;

comparing said analog level to said received test signal, and computing said analog impairment by finding the difference between said analog level and said received test signal.

8. The method of claim 7, wherein said known standard is a $\mu$-law standard.

9. The method of claim 7, wherein said known standard is a A-law standard.

10. The method of claim 1, further comprising repeating the steps (i)–(iv) for each signal transmission between said transmitting modem and said receiving modem.

11. An apparatus for detecting and compensating for telephone network impairment in signal transmissions between a transmitting modem and a receiving modem coupled together via a telephone network, said telephone network comprising analog components and digital components, said apparatus comprising:
- means for detecting telephone network impairment, including digital impairment and analog impairment, between said transmitting modem and said receiving modem; and
- means for compensating said telephone network impairment; wherein said detection means comprises;
  - a first computation means for computing analog impairment between said transmitting modem and said receiving modem; and
  - a second computation means for computing digital impairment between said transmitting modem and said receiving modem.

12. The apparatus of claim 11, wherein said detection means comprises:
- a first computation means for computing analog impairment between said transmitting modem and said receiving modem; and
- a second computation means for computing digital impairment between said transmitting modem and said receiving modem.

13. The apparatus of claim 12, wherein said second computing means comprises:
- a determining means for determining a corresponding analog level of a transmitted test signal in accordance with a known standard;
- a comparing means for comparing said analog level to said a received test signal, and
- a calculator for calculating said analog impairment by finding the difference between said analog level and said received test signal.

14. The apparatus of claim 13, wherein said known standard is a µ-law standard.

15. The apparatus of claim 13, wherein said known standard is a A-law standard.

16. The apparatus of claim 11, wherein said compensation means comprises:
- analog impairment compensation means capable of scaling down an amplitude level of a transmitted signal by a predetermined inversion factor; and
- digital impairment compensation means capable of direct inversion mapping of the said transmitted test signal.

17. The apparatus of claim 16, wherein said predetermined inversion factor is inversely proportional to said analog impairment.

18. A first modem for detecting and compensating for telephone network impairment in signal transmissions between said first modem and a second modem, said first modem and said second modem coupled together via a telephone network, said telephone network comprising analog components and digital components, said first modem comprising:
- means for detecting telephone network impairment, including digital impairment and analog impairment, between said first modem and said second modem; and
- means for compensating for said telephone network impairment;
- wherein said detection means comprises;
  - a first computation means for computing analog impairment between said first modem and said second modem; and
  - a second computation means for computing digital impairment between said first modem and said second modem.

19. The modem of claim 18, wherein said detection means comprises:
- a first computation means for computing analog impairment between said first modem and said second modem; and
- a second computation means for computing digital impairment between said first modem and said second modem.

20. The modem of claim 19, wherein said second computing means comprises:
- a determining means for determining a corresponding analog level of a transmitted test signal in accordance with a known standard;
- a comparing means for comparing said analog level to said a received test signal, and
- a calculator for calculating said analog impairment by finding the difference between said analog level and said received test signal.

21. The modem of claim 20, wherein said known standard is a µ-law standard.

22. The modem of claim 20, wherein said known standard is a A-law standard.

23. The modem of claim 18, wherein said compensation means comprises:
- analog impairment compensation means capable of scaling down an amplitude level of a transmitted signal by a predetermined inversion factor; and
- digital impairment compensation means capable of direct inversion mapping of said transmitted signal.

24. The modem of claim 23, wherein said predetermined inversion factor is inversely proportional to said analog impairment.

25. The modem of claim 18, wherein said first modem is a transmitting modem and said second modem is a receiving modem.

26. The modem of claim 18, wherein said first modem is a receiving modem and said second modem is a transmitting modem.

* * * * *